United States Patent
Reyhanloo

(10) Patent No.: US 8,364,030 B2
(45) Date of Patent: Jan. 29, 2013

(54) HEATING DEVICE FOR A BEVERAGE-MAKING MACHINE

(75) Inventor: Shahryar Reyhanloo, Lohn Ammannsegg (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 718 days.

(21) Appl. No.: 12/301,418

(22) PCT Filed: May 21, 2007

(86) PCT No.: PCT/CH2007/000257
§ 371 (c)(1),
(2), (4) Date: Aug. 7, 2009

(87) PCT Pub. No.: WO2007/134476
PCT Pub. Date: Nov. 29, 2007

(65) Prior Publication Data
US 2010/0003022 A1    Jan. 7, 2010

(30) Foreign Application Priority Data

May 22, 2006 (CH) .......................................... 827/06

(51) Int. Cl.
*A47J 31/00* (2006.01)
*A47J 31/44* (2006.01)
(52) U.S. Cl. .......................................... 392/465; 99/293
(58) Field of Classification Search ................... 392/465; 99/293
See application file for complete search history.

(56) References Cited

U.S. PATENT DOCUMENTS

2003/0066430 A1    4/2003    Bitar
2004/0177760 A1    9/2004    Eicher

FOREIGN PATENT DOCUMENTS

| | | |
|---|---|---|
| DE | 35 21 989 | 1/1987 |
| DE | 39 12 788 | 10/1990 |
| DE | 42 04 746 | 10/1993 |
| EP | 676 163 | 1/1995 |

OTHER PUBLICATIONS

Search report published with international application PCT/CH2007/000257, Oct. 15, 2007, 2 pages.

*Primary Examiner* — Thor Campbell
(74) *Attorney, Agent, or Firm* — Pillsbury Winthrop Shaw Pittman LLP

(57) ABSTRACT

A heating device for a beverage-making machine has at least one water pump for supplying water to a first continuous-flow heater for generating hot water and to a second continuous-flow heater for generating steam. The first continuous-flow heater is switched over, if required, to steam generation and be connected up to the second continuous-flow heater. The second continuous-flow heater can also be switched over, if required, to hot-water generation and to be connected up to the first continuous-flow heater. A control means which is provided for controlling the switchover operations and the connections between the continuous-flow heaters, and is configured depending upon entries input into an operating unit and relating to the previous operating state of the heating device. In comparison with conventional appliances, the configuration envisaged for the heating device also makes it possible to provide relatively large quantities of hot water or steam in a relatively short period of time.

13 Claims, 6 Drawing Sheets

HEATING DEVICE FOR A BEVERAGE-MAKING MACHINE

CROSS REFERENCE TO RELATED APPLICATIONS

This is the U.S. National Phase of PCT/CH2007/000257, filed May 21, 2007, which in turn claims priority to Swiss patent application No. 827/06, filed May 22, 2006, the entire contents of both of which are incorporated herein by reference.

The invention relates to a heating device for a beverage-making machine having a water tank, at least one water pump for supplying water to a first continuous-flow heater for generating hot water and to a second continuous-flow heater for generating steam.

The use of independent continuous-flow heaters for providing hot-water and steam is very common to many of today's beverage-making machines because it enables the efficient preparation of beverages of consistent quality. For due to the thermal inertia of individual hot-water and steam generating components in particular, it has proved to be difficult, as a rule, to provide both hot-water and steam using only one continuous-flow heater or heating element. At the same time it is necessary to be able to offer structurally simple and reliably functioning beverage-making devices for non-industrial purposes with which, if required, also larger amounts of hot-water or steam may be generated within a relatively short period of time.

An example of a beverage-making machine having two heating elements is the DE-42 04 746-C2. It discloses a coffee machine having a heating block with two continuous-flow heaters and a pump. A first continuous-flow heater is connected to a brewing head for producing a coffee infusion, whilst a second continuous-flow heater is connected to a steam nozzle for heating or foaming milk. With this device only the continuous-flow heater being filled with water is the one active at any one time. The other continuous-flow heater, although becoming hot, remains inactive. A fixed association therefore (typically) exists between the continuous-flow heater and its respective function (generation of hot-water or steam).

The DE-39 12 788-A1 also discloses a coffee machine, in this case comprising three continuous-flow heaters and a pump, which again have clearly defined functions allocated to them, i.e. functions for the generation of coffee, hot-water or steam.

The DE-35 21 989-A1 finally discloses a device for generating steam in conjunction with a coffee or espresso machine for heating liquids. This device has a pump, a first heater and a coffee brewing head, whereby a two-way valve is inserted in front of the brewing head which allows the water heated by the first heater to be directed selectively to the brewing head or to a second heater. The second heater is provided for supplying the necessary vaporising heat to the already heated water in order to convert it into steam. Here again, the two heaters have clearly defined functions allocated to them (for the generation of hot-water or steam), but the generation of steam is dependent upon the first heater also playing a part.

It is therefore the requirement of the invention to propose a beverage-making device, in which the existing heating devices (continuous-flow heaters for example) may be utilised in an efficient and versatile manner.

This requirement is met by the features of patent claim 1. The solution is based on the fact that two in principle autonomously functioning continuous-flow heaters may operate in conjunction with both a correspondingly configured control means and the specific arrangement of components, both heaters operating both autonomously on their own and in cooperation with each other for the same product (hot-water or steam).

In particular this is based on the fact that two continuous-flow heaters are provided—a first one for generating hot-water and a second one for generating steam. With this arrangement the first continuous-flow heater may be switched-over to steam generation and connected up to the second continuous-flow heater, and/or a second continuous-flow heater may be switched-over to hot-water generation and connected up to the first continuous-flow heater.

Thus due to the heating elements being switched in parallel, either the hot-water generating capacity or the steam generating capacity may be increased. Therefore the solution according to the invention makes it possible also for beverage-making devices of similar construction (i.e. with two continuous-flow heaters) to be equipped with this extended functionality.

Since, as already mentioned, the thermal inertia of the individual hot-water or steam making components plays a role, it is important that the first and/or the second continuous-flow heater is capable of being connected up to the respectively other continuous-flow heater simultaneously or with a time delay. Time-delayed connecting-up may be required, for instance, if after preparing a beverage portion using hot-water, a large beverage portion is required to be prepared using steam, or if after preparing a large beverage portion using steam a large beverage portion using hot-water is required to be prepared. In the first case the heating element used for support needs a certain warming-up period, in the latter case the heating element used for support needs a certain cooling-down period. It is understood that a suitable control means must be present for technically mastering these conditions. The control means is used to control the switch-over of the continuous-flow heaters for generating hot-water or steam as well as for controlling the connecting-up of the continuous-flow heaters. Controlling the connecting-up operation is a matter of connecting the first continuous-flow heater to the second continuous-flow heater or the second continuous-flow heater to the first continuous-flow heater depending, in both cases, on inputs at an operating unit and the previous operating state of the beverage-making machine or beverage-making device. In addition technical mastering is improved by arranging the components of the beverage-making device in an inventive way.

Thus, provided both heating elements are equipped with the specified switch-over capabilities, it is possible, in principle, to select the operations "normal steam supply", "increased steam supply (power steam)", "normal hot-water supply" and "increased hot-water supply (power hot water)" via inputs at the operating unit. The "increased" supply capabilities indicate that the beverage-making device according to the invention can achieve either increased hot-water capacity or increased steam capacity. But it is also feasible to envisage simplified variants of beverage-making machines, on which apart from the normal supply capabilities only "increased hot-water supply" or only "increased steam supply" may be selected.

With regard to arranging the component parts of the heating device in a specific way, the following may be provided:

It is advantageous to provide a second steam outlet pipe. Normally steam outlet pipes have a defined pipe diameter which should be selected to be neither too small nor too large. If the diameter is too small, steam exhaust pressure becomes too large. If, however, it is too large, steam quality is impaired.

Therefore it is more advantageous to provide a further steam outlet pipe for increased steam generation capacity.

Preferably the basic arrangement of the components in the heating device is such that a first steam outlet pipe is connected with the second continuous-flow heater (normally provided for the generation of steam) via a first solenoid valve, and a second steam outlet pipe is connected with the first continuous-flow heater (normally provided for the generation of hot-water) via a second solenoid valve.

Furthermore it is advantageous to connect a hot-water outlet pipe with the second continuous-flow heater via a third solenoid valve and a throttle valve, and to connect it with the first continuous-flow heater via a switch-over valve and a return valve. The throttle valve ensures that pressure in the second continuous-flow heater (normally used for generating steam), in the case of increased hot-water demand, does not become the cause of hot water splashing into the cup in a dangerous manner. The return valve ensures that during heating-up of the first continuous-flow heater water does not suddenly drop from the hot-water outlet pipe as long as the switch-over valve (which is provided for the purpose of switching from dispensing coffee to dispensing hot-water) is open.

The switch-over valve (for switching over from dispensing coffee to dispensing hot-water) can preferably be manually or electrically controlled because on common coffee-making machines corresponding selection may usually be effected manually or via the operating unit.

An example of a heating device according to the invention will now be explained in detail with reference to the drawings.

IN THE DRAWINGS

Figure 1:
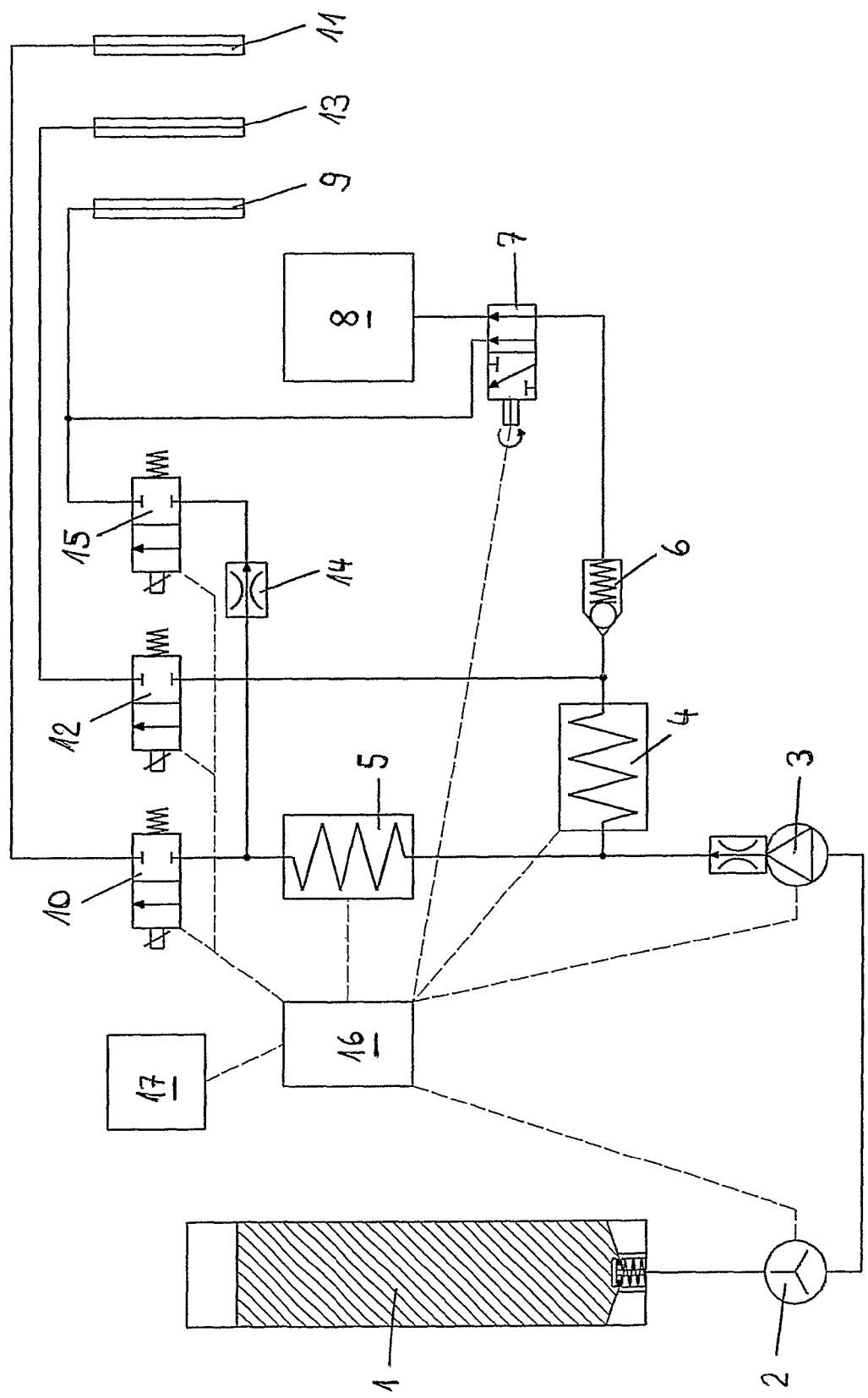
FIG. 1 shows a principal arrangement of the component parts of a heating device.
Figure 2:
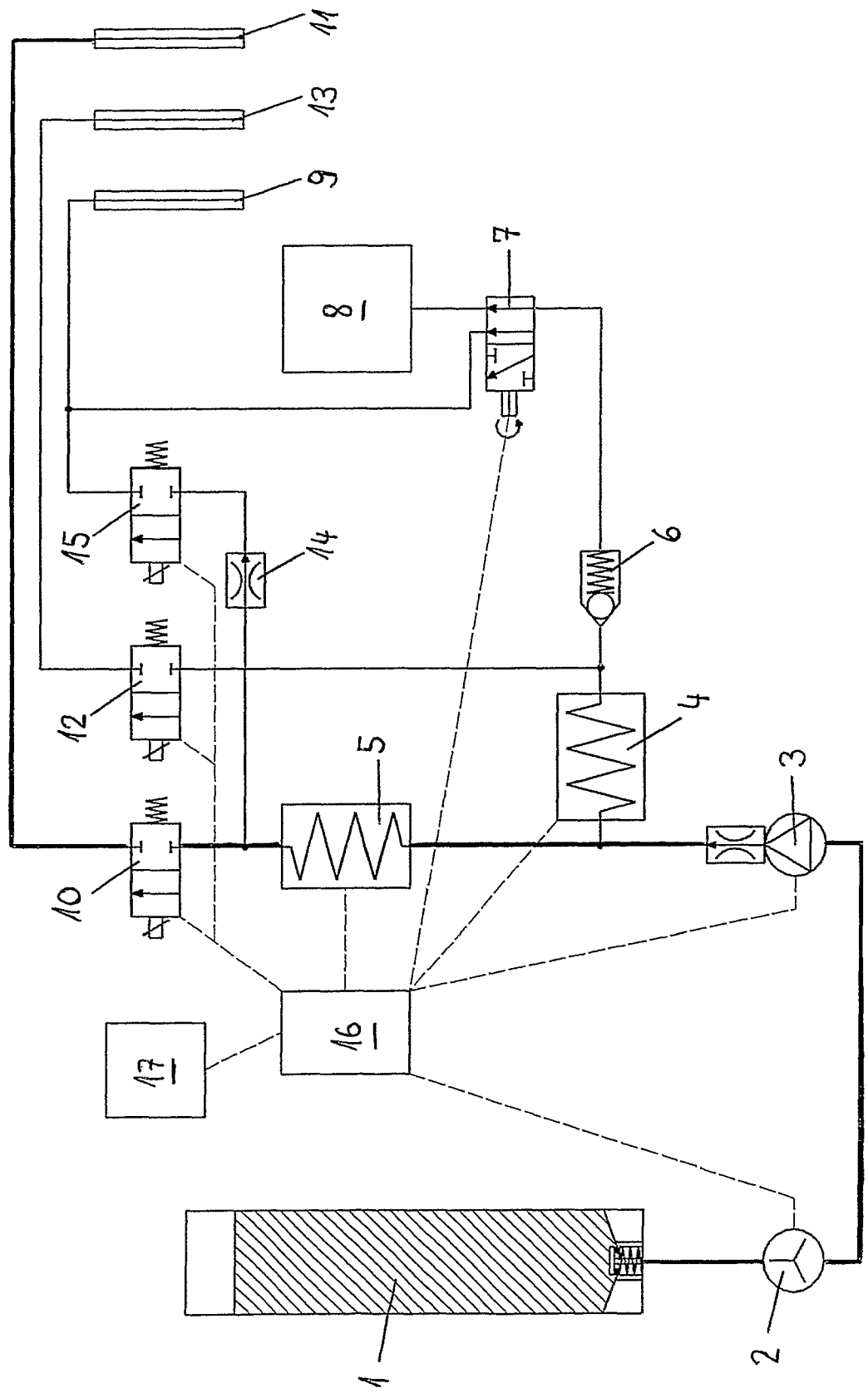
FIG. 2 shows a schematic illustration of the operating mode "normal steam supply"
Figure 3:
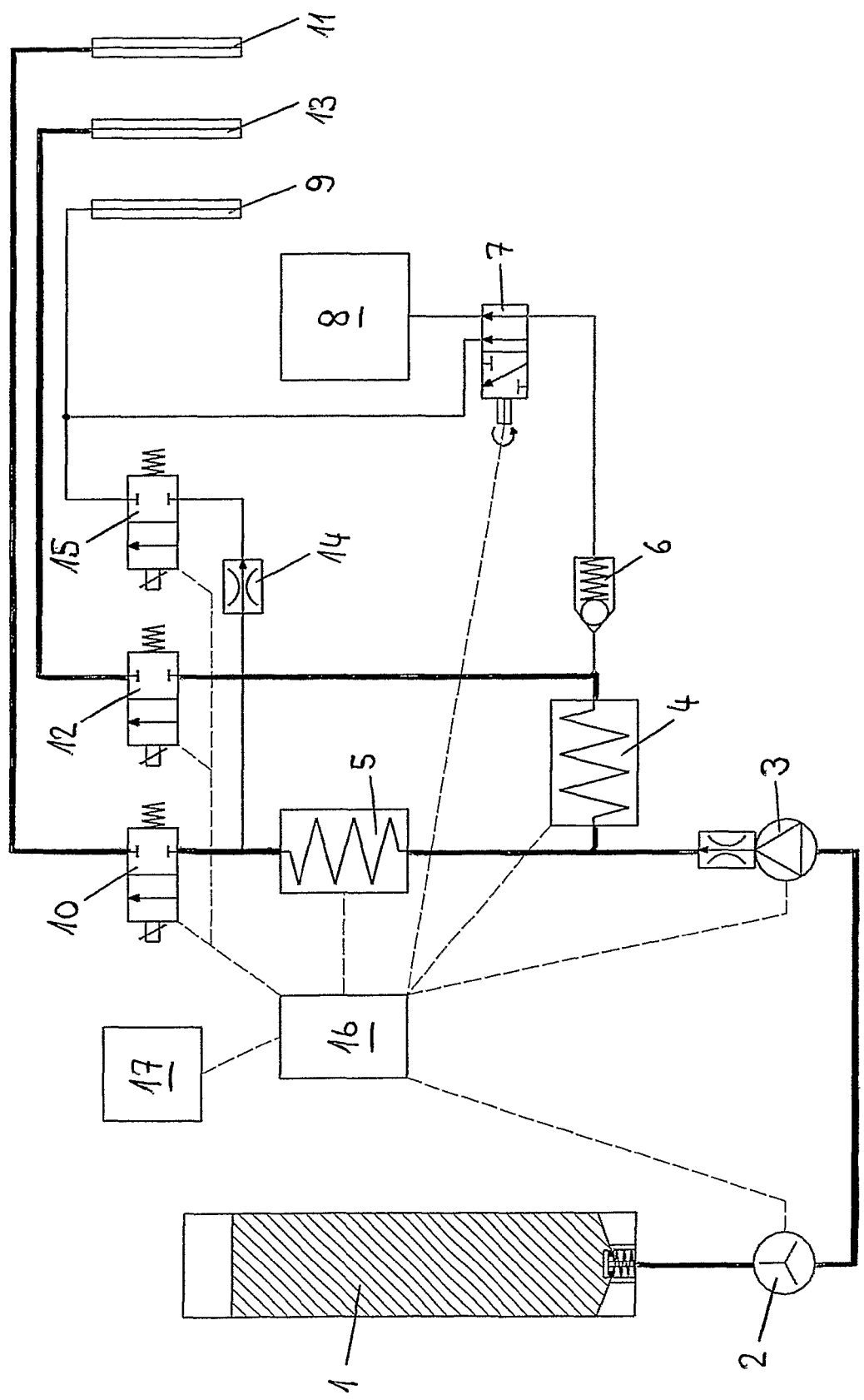
FIG. 3 shows a schematic illustration of the operating mode "increased steam supply (power steam)"
Figure 4:
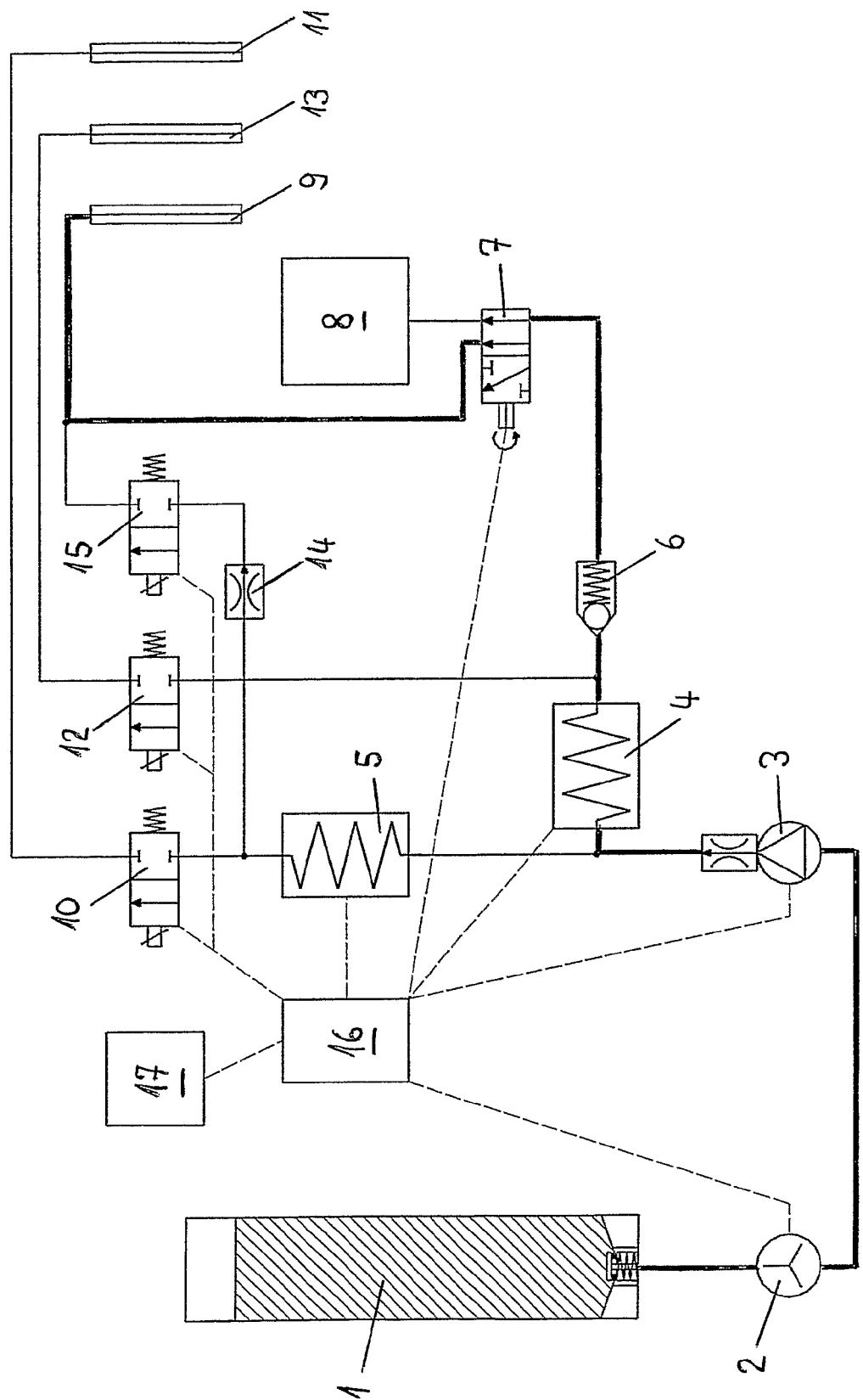
FIG. 4 shows a schematic illustration of the operating mode "normal hot-water supply"
Figure 5:
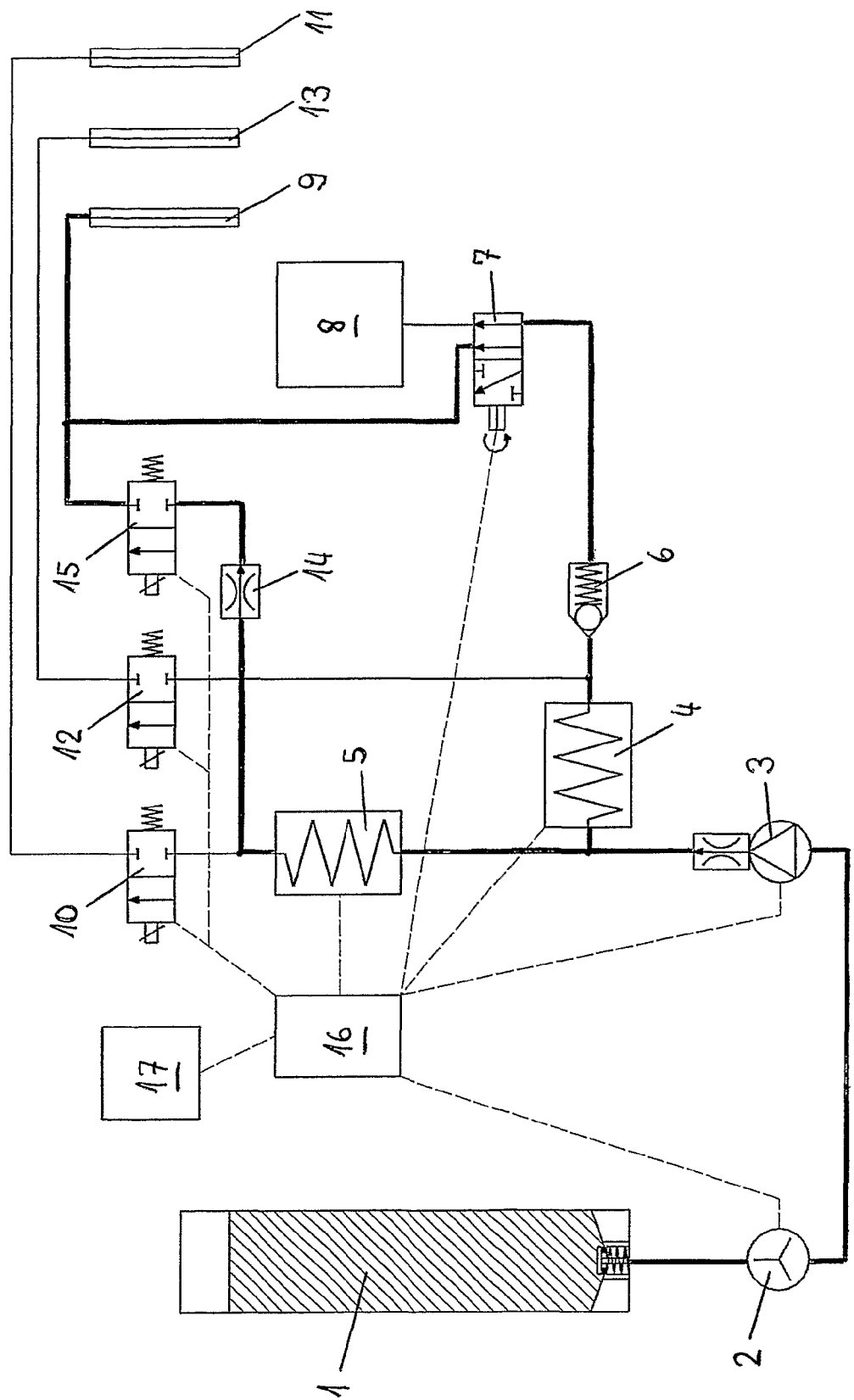
FIG. 5 shows a schematic illustration of the operating mode "increased hot-water supply (power hot water)".

FIG. 1 illustrates the principal arrangement of component parts of a heating device according to the invention for a beverage-making machine. From a water tank 1 water flows to a water pump 3 with a diaphragm flow controller via a flow meter 2. Water pump 3 supplies a first continuous-flow heater 4 and a second continuous-flow heater 5. Normally the first continuous-flow heater 4 is used for generating hot water, either for supplying hot-water or for supplying coffee. The second continuous-flow heater 5 is normally used for supplying steam. However, the continuous-flow heaters 4, 5 (also called thermal blocks, heating blocks, heating elements etc.) are both used for producing hot water or steam and are configured accordingly.

The output of the first continuous-flow heater 4 is connected to a switch-over valve 7 via a return valve 6. The switch-over valve 7 is used for switching the operating mode from hot-water supply to coffee supply (and vice versa). The switch-over valve 7 may be actuated manually or electrically. The output of the switch-over valve 7 is connected on the one hand to a coffee-making device 8 and, on the other, to a hot-water delivery pipe 9. If hot water is being drawn this is always effected via the hot-water delivery pipe 9. However, since coffee-making is not the main subject of the present invention, it is assumed that, in principle, the functionality of this is known to the expert, and therefore no further explanation is given.

The output of the second continuous-flow heater 5 is connected to a first steam outlet pipe 11 via a first solenoid valve 10. If steam is being drawn in the normal way this is always effected via the steam outlet pipe 11.

In order to extend the functionality in terms of the present invention the output of the first continuous-flow heater 4 is connected to a second steam outlet pipe 13 via a second solenoid valve 12. In addition the output of the second continuous-flow heater 5 is also connected to the hot-water delivery pipe 9 via a throttle valve 14 and a third solenoid valve 15. If increased steam capacity or increased hot-water capacity is required, the desired product may be made available at the corresponding outlets via the second and third solenoid valves 12, 15.

As can be seen, a second steam outlet pipe 13 is provided in the case of increased steam capacity, so that steam quality and safety continue to be guaranteed. In the case of increased hot-water capacity, on the other hand, the already existing hot-water delivery pipe 9 may be readily utilised because this does not give rise to any additional problems.

Control of all operations of the heating device or beverage-making machine including the heating device according to the invention is effected via a control means 16 and an operating unit 17. The control means 16 may be realised using a microprocessor in a manner known to the expert. The operating unit contains operating, triggering and indicating elements in a manner also known to the expert, which elements enable the user of the beverage-making machine to operate it in an easy and simple manner. Furthermore the control means, of course, also influences connections to the components to be controlled, such as flow meter 2, water pump 3, first continuous-flow heater 4, second continuous-flow heater 5, switch-over valve 7 and solenoid valves 10, 12, 15. These connections may include control and monitoring connections, in the latter case for monitoring temperatures, for example.

As already mentioned, the heating device according to the invention makes it possible, in principle, to use the following four operating capabilities or modes:
1. "normal steam supply"
2. "increased steam supply (power steam)"
3. "normal hot-water supply"
4. "increased hot-water supply (power hot water)"

In FIGS. 2 to 5 these four operating modes are schematically illustrated with the main flow paths highlighted and will, hereunder, be explained in detail:
1. "Normal steam supply" (see FIG. 2)
   Initially steam supply is triggered by operating unit 17.
   The electronics of control means 16 keeps the solenoid valves 12, 15 closed, opens the first solenoid valve 10 and activates water pump 3 including the diaphragm controller.
   Water flows from water tank 1 through flow meter 2 and further through water pump 3 with diaphragm controller. In the second continuous-flow heater 5 the water is heated to become steam, and steam reaches the first steam outlet pipe 11 via the first solenoid valve 10.
   When a certain time is reached water pump 3 is turned off by the electronics of control means 16, and the electronics of control means 16 closes the first solenoid valve 10 again.

2. "Increased steam supply (power steam)" (see FIG. 3)
   Initially steam supply (power steam) is triggered by operating unit 17.
   The electronics of control means 16 keeps the solenoid valves 12, 15 closed, opens the first solenoid valve 10 and activates water pump 3 with diaphragm controller.
   Water flows from water tank 1 through flow meter 2 and further through water pump 3 with diaphragm controller. In the second continuous-flow heater 5 the water is heated to become steam, and steam reaches the first steam outlet pipe 11 via the first solenoid valve 10.
   Simultaneously the first continuous-flow heater 4 is heated to steam temperature. When this temperature is reached, the electronics of control means 16 opens the second solenoid valve 12. This enables the additionally generated steam to reach the liquid to be heated via the second steam outlet pipe 13.
   When a certain time is reached water pump 3 is turned off by the electronics of control means 16, and the electronics of control means 16 closes the solenoid valves 10, 12 again.
   If no more steam is required for a certain amount of time, the first continuous-flow heater 4 returns to the standby temperature for hot-water generation.

In order to ensure optimum steam quality and water quality it is necessary for the cross-sections of the outlet pipes to be correct. This means that for steam generation (power steam) it is necessary to have two delivery pipes. Therefore in this case steam is dispensed via the two steam outlet pipes 11 and 13.

3. "Normal hot-water supply" (see FIG. 4)
   Initially hot-water supply is triggered either by operating unit 17 directly (manually) by switch-over valve 7.
   The electronics of control means 16 keeps the solenoid valves 10, 12, 15 closed, opens switch-over valve 7 (unless it was opened manually) and activates water pump 3 with diaphragm controller.
   Water flows from water tank 1 through the flow meter 2 and further through water pump 3 with diaphragm controller. In the first continuous-flow heater 4 water is heated up and reaches the switch-over valve 7 via the return valve 6. Thereafter the hot water reaches a cup or the like via the hot-water delivery pipe 9.
   The flow meter 2 signals to the electronics of control means 16 the amount of water flowing through. When the correct amount of water is reached the water pump 3 is turned off by the control means 16.
   The electronics of control means 16 closes the switch-over valve 7 or indicates to the user that this must now be closed manually.

The diaphragm controller on water pump 3 is provided for calming the system and absorbing the knocks of the water pump. The return valve 6 is required in order to prevent water from suddenly dropping from the hot-water delivery pipe 9 while switch-over valve 7 is still open.

4. "Increased hot-water supply (power hot-water)" (see FIG. 5)
   Initially hot-water supply is triggered by operating unit 17.
   The electronics of control means 16 keeps the solenoid valves 10, 12 closed, opens switch-over valve 7 and the third solenoid valve 15 and activates water pump 3 with diaphragm controller.
   Water now flows from water tank 1 through flow meter 2 and further through water pump 3 with diaphragm controller. In the first continuous-flow heater 4, water is heated up and reaches switch-over valve 7 via return valve 6. Thereafter the hot water reaches a cup or the like via the hot-water delivery pipe 9.
   Simultaneously water also flows through the second continuous-flow heater 5, through throttle valve 14 and the third solenoid valve 15 and also through the hot-water delivery pipe 9.
   The flow meter 2 signals to the electronics of control means 16 the amount of water flowing through. When the correct amount of water is reached water pump 3 is turned off by the electronics of control means 16.
   The electronics of control means 16 closes the third solenoid valve 15 and the switch-over valve 7, or indicates to the user that this must be closed manually.
   Throttle valve 14 reduces pressure thereby preventing the second continuous-flow heater 5, provided it has previously been up to steam temperature, from allowing hot-water to splash into the cup.

In addition it is possible to generate hot-water mixed with steam provided this is desired or meaningful for certain applications. To this end all that is necessary is to operate the second continuous-flow heater 5 at increased capacity compared to the first continuous-flow heater 4. Now as before fluid is supplied at increased output capacity by connecting-up to a further continuous-flow heater.

Figure 6:
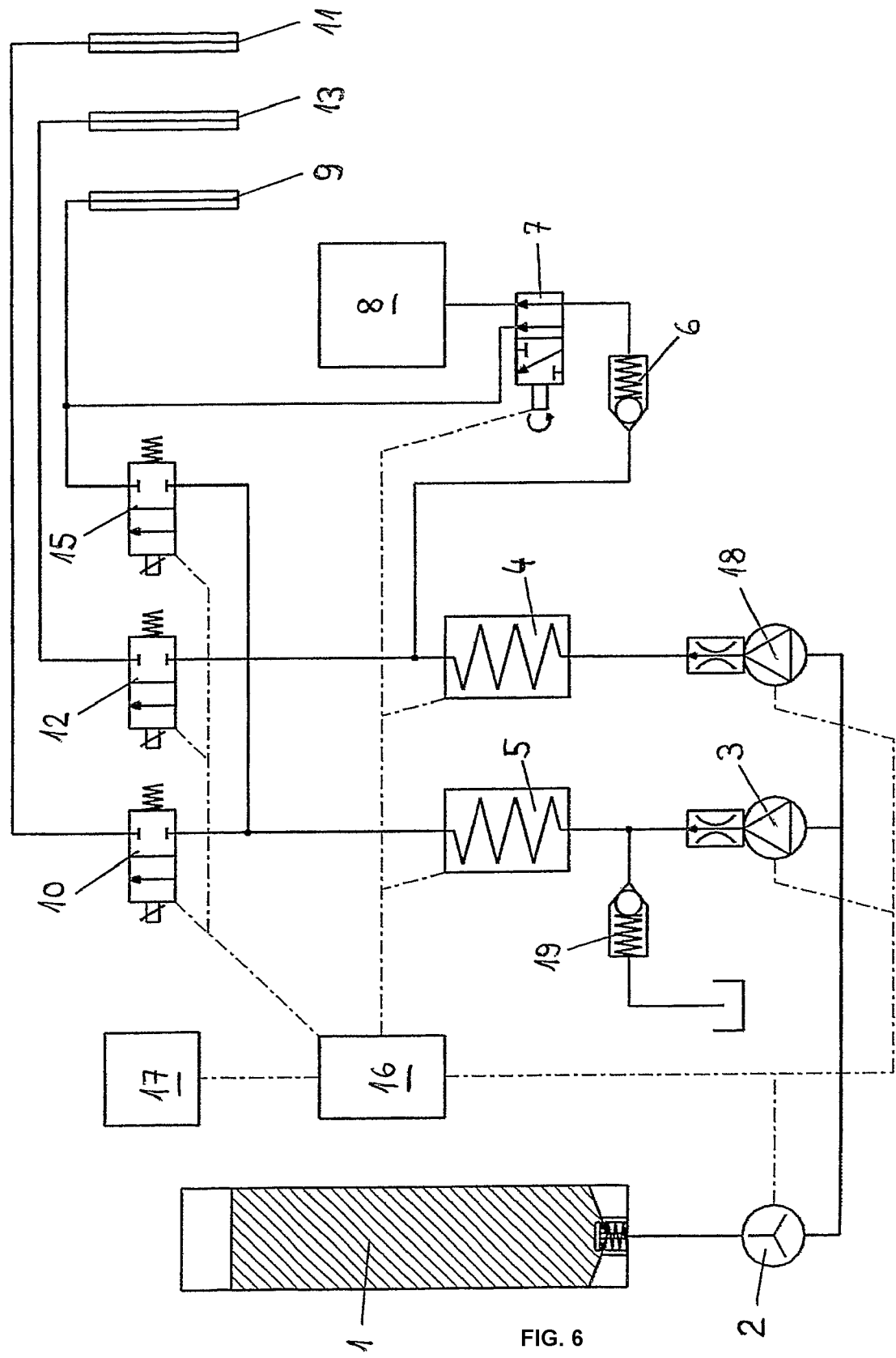
FIG. 6 shows the principal arrangement of the component parts of a heating device having two water pumps.

FIG. 6 finally illustrates the principal arrangement of the component parts of a heating device with two water pumps. In order to improve product quality it may be necessary or desirable to supply the respectively required amount of water to each continuous-flow heater in a controlled manner, this being water pump 18 in the case of the first continuous-flow heater 4, and water pump 3 in the case of the second continuous-flow heater 5.

In this case also, the amount of water is controlled via control means 16. The method of functioning in the four operating modes "normal steam supply", "increased steam supply", "normal hot-water supply" and "increased hot-water supply" is the same in principle as illustrated in the corresponding FIGS. 2-5 and associated explanations.

Furthermore it is likely to be known to the expert that the illustrated schematic function drawings only serve the purpose of explaining the functional principle, and that in general, known technical details are therefore not shown or described in detail. Thus FIG. 6 additionally shows an overpressure valve 19 commonly arranged in the area of the continuous-flow heater 5 for safety reasons.

Drawing Legends

1 Water tank
2 Flow meter
3 Water pump
4 First continuous-flow heater
5 Second continuous-flow heater
6 Return valve
7 Switch-over valve
8 Coffee-making device
9 Hot-water delivery pipe
10 First solenoid valve
11 First steam outlet pipe
12 Second solenoid valve
13 Second steam outlet pipe
14 Throttle valve
15 Third solenoid valve
16 Control means
17 Operating unit
18 Second water pump
19 Overpressure valve

The invention claimed is:

1. A heating device for a beverage-making machine comprising:
   a first continuous-flow heater configured to be in hot water generation mode or steam generation mode;
   a second continuous-flow heater configured to be in hot water generation mode or steam generation mode;
   a water pump configured for supplying water to the first continuous-flow heater and to the second continuous-flow heater; and
   a control configured to switch
   (i) the first continuous-flow heater to the steam generation mode and to couple an output of the first continuous-flow heater to an output of the second continuous flow heater; and/or
   (ii) the second continuous-flow heater to the hot-water generation mode and to couple the output of the second continuous-flow heater to the output of the first continuous flow heater.

2. Heating device according to claim 1, wherein the continuous-flow heaters are coupled simultaneously or with a time-delay.

3. Heating device according to claim 1, wherein the control is configured to switch the continuous-flow heaters based on inputs at an operating unit and the previous operating state of the heating device.

4. Heating device according to claim 3, wherein the inputs at the operating unit are used to select one or more of the following operations: "normal steam supply", "increased steam supply", "normal water supply" or "increased water supply".

5. Heating device according to claim 1, further comprising first and second steam outlet pipes.

6. Heating device according to claim 5, wherein the first steam outlet pipe is coupled to the second continuous-flow heater via a first solenoid valve.

7. Heating device according to claim 5, wherein the second steam outlet pipe is coupled to the first continuous-flow heater via a second solenoid valve.

8. Heating device according to claim 1, further comprising a hot-water delivery pipe coupled to the second continuous-flow heater via a third solenoid valve and a throttle valve and with the first continuous-flow heater via a switch-over valve and a return valve.

9. Heating device according to claim 8, wherein the switch-over valve is controlled manually or electrically.

10. Heating device according to claim 1, wherein the water pump delivers water from a water tank in all operating modes of the heating device.

11. Heating device according to claim 1, wherein each of the continuous-flow heaters has a respective water pump associated with it.

12. Heating device according to claim 1, wherein the continuous-flow heaters, when coupled, are configured to provide a larger amount of hot-water, steam, or hot-water mixed with steam as compared to the output of either the first or the second continuous-flow heaters.

13. Heating device according to claim 1, wherein the coupled arrangement between the first and second continuous-flow heaters comprises: a singled outlet pipe or a pair of parallel outlet pipes.

* * * * *